UNITED STATES PATENT OFFICE.

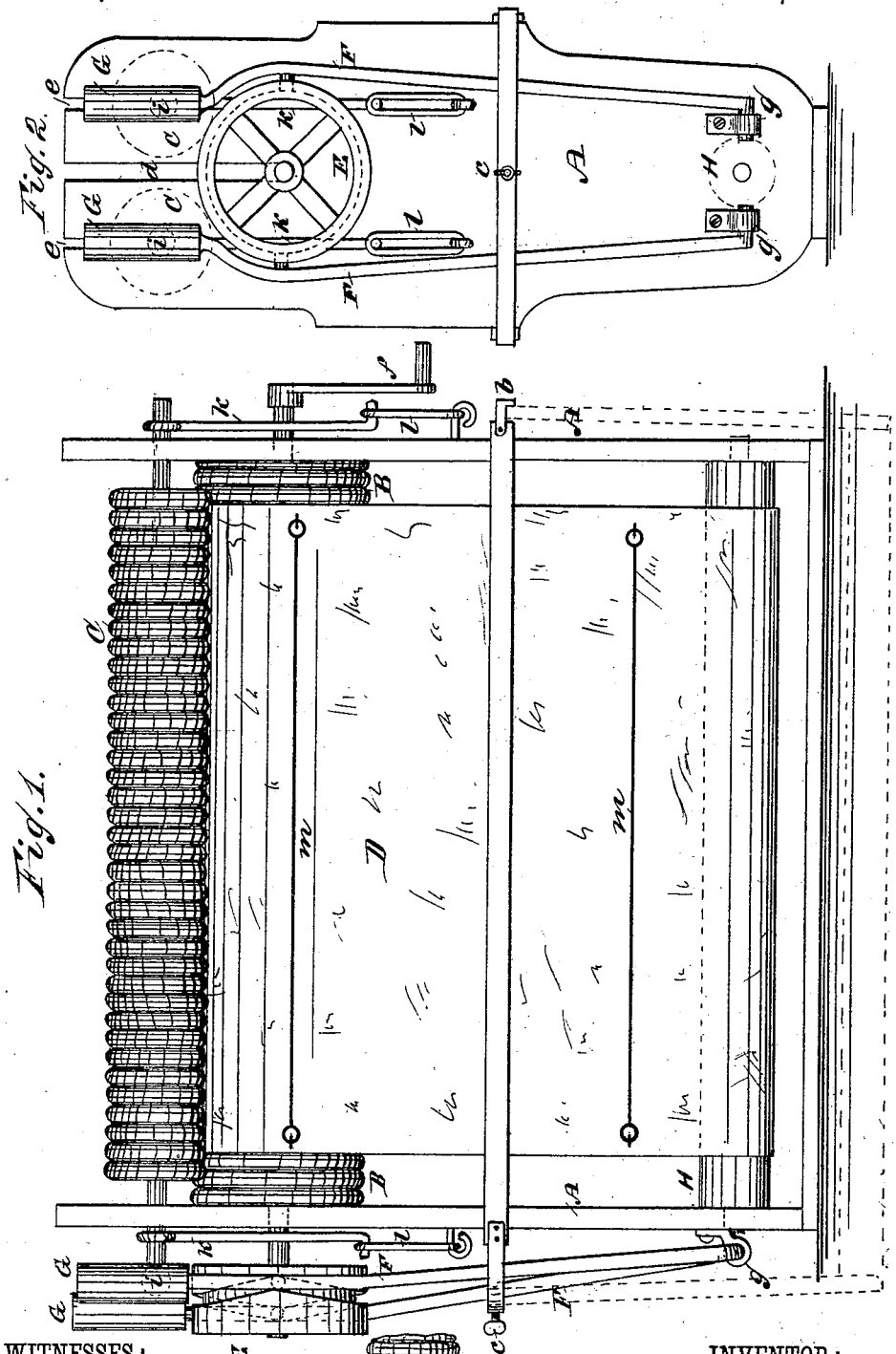

JONATHAN E. HOBBY, OF OMIO, KANSAS.

WASHING-MACHINE.

SPECIFICATION forming part of Letters Patent No. 266,151, dated October 17, 1882.

Application filed February 17, 1882. (No model.)

*To all whom it may concern:*

Be it known that I, JONATHAN EBENEZER HOBBY, of Omio, in the county of Jewell and State of Kansas, have invented a new and useful Improvement in Clothes-Washers, of which the following is a full, clear, and exact description.

Reference is to be had to the accompanying drawings, forming a part of this specification, in which similar letters of reference indicate corresponding parts in all the figures.

Figure 1 is a side elevation of a clothes-washer constructed in accordance with the invention. Fig. 2 is an end elevation of the same, and Fig. 3 is a top view of one end of one of a pair of rollers used in the machine with attachments for reciprocating it longitudinally.

This washer is designed to be placed in a wash-tub and to be se ured to the upper edges or sides thereof.

The invention will first be described in connection with drawings, and then pointed out in the claim.

A is the frame of the washer, which frame may be of any suitable construction.

Attached to one side or end piece of the frame, at a proper distance from its base, are hooks or supporting-irons *b*, and a thumb-screw, *c*, on the opposite end for securing the washer to the sides of a wash-tub, in which, when operating it, the machine is to be set or placed.

In the upper portion of the frame, which extends above the wash-tub, are vertical slots *d*, forming bearings in the end pieces of the frame for a horizontal roller, B, and immediately above this roller, and resting on it, are a pair of smaller rollers, C C, which are parallel with each other and with the roller B, and are hung so as to be at liberty to rise and fall within slots *e* in the end pieces of the frame. These several rollers B and C C are preferably made of wood, and are annularly corrugated on their exteriors. The larger one, B, of these rollers is the driving one, and may be rotated by a hand-crank, *f*. The two smaller rollers C C are rotated by the frictional contact of the clothes, which pass between them and the roller B. The rollers C C, in addition to their rotary motions, are longitudinally vibrated or reciprocated simultaneously in reverse directions. Such reciprocating movements are given to said rollers C C by a grooved cam, E, on one end of the shaft of the roller B and rods F F, hinged below at *g g*, and having projections which engage with the grooved cam on opposite sides of it. These rods F F are connected at their upper ends with the upright tubes G G, which have longitudinal slots *h* in them, to receive within them the one end of the shafts or spindles of the upper rollers, C C, and on these ends of said shafts are knobs or projections *i*, whereby the rotation of the cam E gives the necessary reverse reciprocating motions to the rollers C C in direction of their length without restricting the rise and fall of said rollers. It is proposed to have the rollers C C make several reciprocating motions for each revolution of the roller B. The rollers C C, while free or at liberty to rise and fall, are held down to their faces with an elastic pressure by hooked rods *k k*, applied to the opposite projecting ends of the shafts of said rollers, and rubber or other springs, *l l*, connecting the lower ends of said rods with the frame A.

The clothes are carried through between the rollers B and C C by an endless canvas or other suitable flexible apron, D, provided with any number of rods or wires *m m* on and across its outer surface, preferably at equal distances from each other, and on which the clothes to be washed are hung. Said flexible apron D, which projects down within the tub, passes round the larger corrugated roller B and round a lower roller, H, and receives its motion from the roller B. It first carries the clothes hung on the wires *m*, which are attached at their ends to the apron between the roller B and rollers C C, then down into the water in the tub, and afterward up again through between said rollers, and so on indefinitely.

A clothes-washer constructed as herein described will wash several pieces of clothes at the same time both rapidly and easily.

Having thus described my invention, I claim as new and desire to secure by Letters Patent—

In combination with the shaft of roller B, the grooved cam E, the hinged rods F, having projections engaging the opposite sides of said cam, the long slotted tubes G, and the roller-shafts having projections *i*, whereby said rolls C may be reciprocated without any interference with their rotary movement, as described.

JONATHAN E. HOBBY.

Witnesses:
R. F. WILCOX,
I. NIGHTINGALE.